AUTOMATIC COLORIMETRY CALCULATOR
Filed March 30, 1962 2 Sheets-Sheet 1
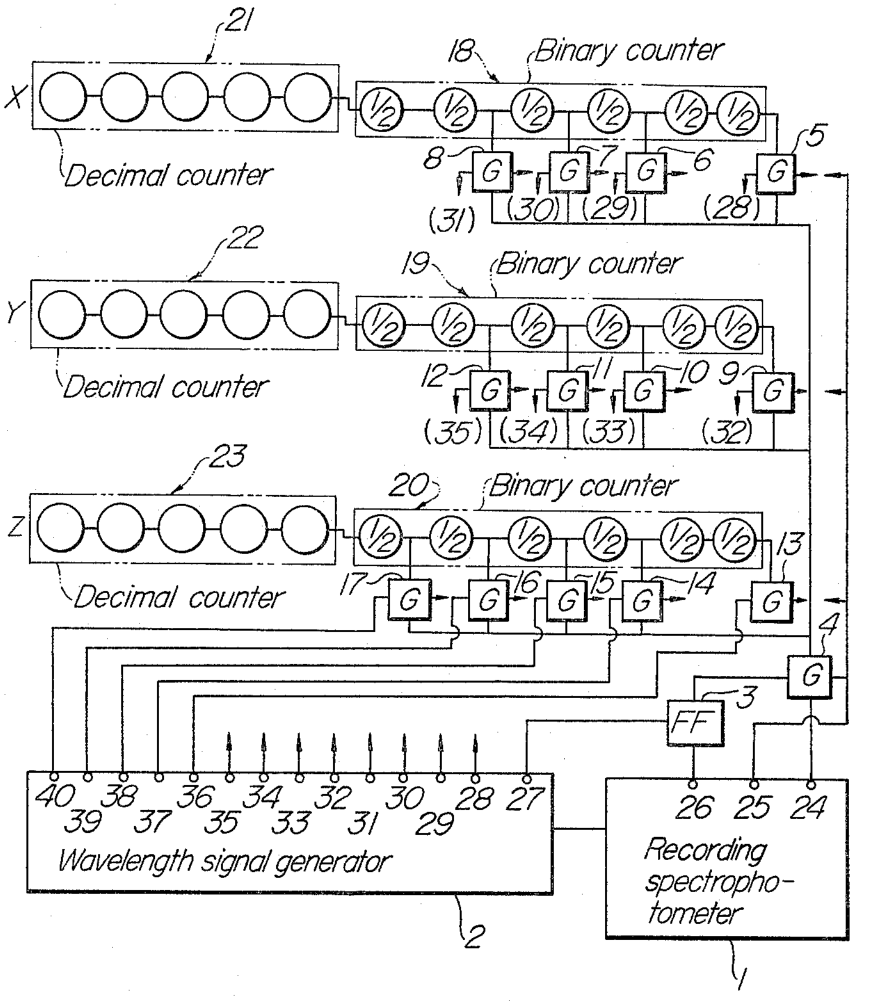
INVENTORS
LEO MORI
ISAMU NIIKURA
BY Fisher, Christen, Sabol & Caldwell
ATTORNEYS AUTOMATIC COLORIMETRY CALCULATOR
Filed March 30, 1962 2 Sheets-Sheet 2
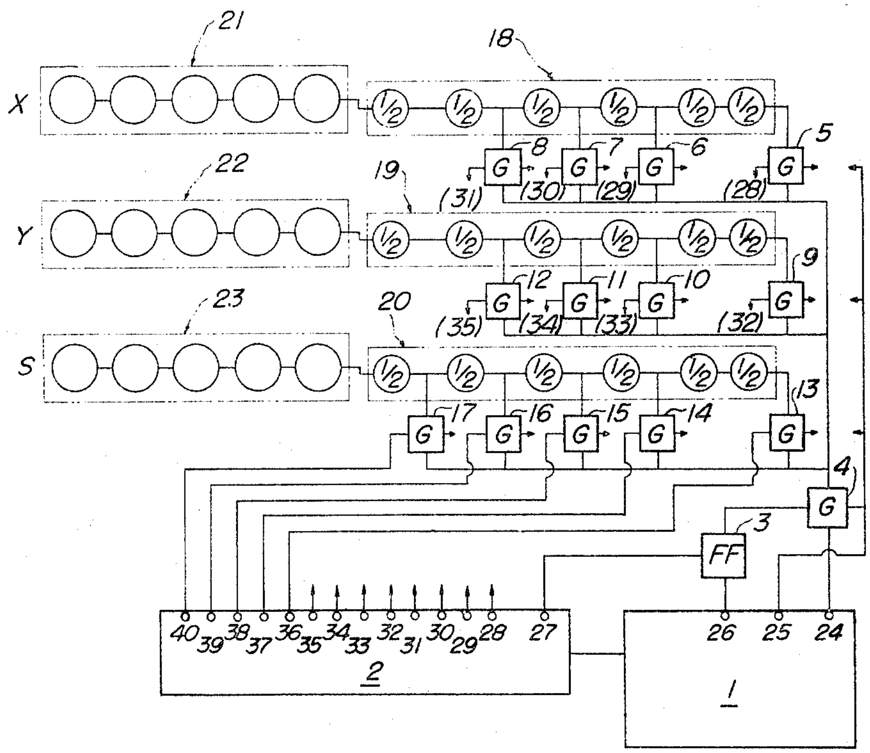

United States Patent Office 3,267,266
Patented August 16, 1966

3,267,266

AUTOMATIC COLORIMETRY CALCULATOR

Leo Mori, Tokyo, and Isamu Niikura, Hiratsuka-shi, Japan, assignors to Tokyo Shibaura Electric Co., Ltd., Kawasaki-shi, Japan, a corporation of Japan Filed Mar. 30, 1962, Ser. No. 183,889
Claims priority, application Japan, Apr. 1, 1961, 36/11,599
5 Claims. (Cl. 235—156)

The present invention relates to an automatic spectrophotometric method of colorimetric calculation and colorimetry calculator and particularly to such calculator, adapted to obtain a desired result of measurement with ease and with minimized error even in the range of wavelengths where the CIE distribution coefficients are small. The CIE distribution coefficients identify the distribution coefficients provided for in the "International Commission on Illumination."

The calculation of the tristimulus values X, Y and Z of a sample substance from its spectral reflectance, spectral transmittance or other spectral output as determined by the use of a spectrophotometer has been based on the following formula:

$$\begin{Bmatrix} X \\ Y \\ Z \end{Bmatrix} = k\int_{\lambda_r}^{\lambda_v} P_\lambda \begin{Bmatrix} \bar{x} \\ \bar{y} \\ \bar{z} \end{Bmatrix} P_\lambda d_\lambda \ . \ . \ . \quad (1)$$

where $$k = 1 \Big/ \int_{\lambda_r}^{\lambda_v} P_\lambda \bar{y}_\lambda d_\lambda ; \ \lambda_v$$

and $\lambda_r$ respectively represent the short and long-end wave lengths of the visible spectrum: $P_\lambda$ represents the spectral distribution of the standard illuminant; and $\bar{x}_\lambda$, $\bar{y}_\lambda$ and $\bar{x}_\lambda$ represent respective CIE distribution coefficients.

Previous methods of automatically performing the above calculation while $\rho\lambda$ is being measured by a recording spectrophotometer are divided into two groups, one performing analog calculation and the other performing digital calculation. The analog methods involve deficiencies such that their accuracy is low or they require an extremely high accuracy in construction of the apparatus for obtaining a satisfactorily high calculation accuracy.

The digital methods of calculation are further divided into weighted ordinate methods and selected ordinate methods. The former necessitate simultaneous performance of complicated multiplication and integration and thus require a costly electronic computer for automatic calculation. As a matter of practice, however, it is extremely uneconomical to provide a computer for exclusive use in colorimetric calculation. This necessitates operations of carding the values of spectral output $\rho_\lambda$ as determined by the spectrophotometer and transferring such carded values into an electronic computer for general use.

In contrast, in the selected ordinate methods, integration of the spectral output values $\rho_\lambda$ at the selected wavelengths as defined by the formula 2 for X, Y and Z forms a major portion of the calculation.

$$\left.\begin{aligned} X &= K_1 \Sigma \rho_\lambda \\ Y &= K_2 \Sigma \rho_\lambda \\ Z &= K_3 \Sigma \rho_\sigma \end{aligned}\right\} \ . \ . \ . \quad (2)$$

For instance, W. E. White and D. L. MacAdam have devised an automatic colorimetric calculator operable on this principle for integrating the $\rho_\lambda$ for the selected wavelengths (see Journal of Optical Society of America, vol. 47, page 605, 1957). However, the use of the selected ordinate method, in which the intervals between the selected wavelengths are markedly wide in the spectral range where the CIE distribution coefficients are small, may possibly involve a considerable error in the calculated value particularly for samples widely varying in spectral output distribution. It is another defect of this method that the values indicated by the calculator must be multiplied by $K_1$, $K_2$ and $K_3$. For example, the ratio of $K_1:K_2:K_3$ is 0.9804:1,0000:1.1810 for illuminant C and thus such multiplication cannot be made by heart.

According to the present invention, in colorimetric calculation employing a recording spectrophotometer which gives the value of spectral reflectance, spectral transmittance or other like spectral output in the form of the number of pulses in a pulse group, integration is performed by multiplying such coefficients as ½, ¼, ⅛, . . . in the wavelength range where the CIE distribution coefficients are limited without resorting to the ordinary selected ordinate method. Such operation of multiplying coefficients $½^m$ (where $m$ is zero or any positive integer) can be carried out by use of simple binary counter circuits rendering the arrangement of such an integrator free from intricacy.

Such an integrator may also be arranged so as to indicate the values of X, Y and Z merely by integrating a number of pulses at the wavelengths appropriately selected instead of integration followed by multiplication of the integrated values by the coefficients $K_1$, $K_2$ and $K_3$.

Accordingly, one object of the present invention is to provide a spectrophotometric apparatus of colorimetric calculation adapted to obtain tristimulus values X, Y, and Z with a minimum of error for a sample which has complicated spectral characteristics in the range of wavelength where the CIE distribution coefficients are small.

Another object of the present invention is to perform such calculation by means of a relatively simple addition circuit comprising in combination binary counter circuits and decimal counter circuits.

Other objects and advantages of the present invention will be apparent from the following description when read with reference to the accompanying drawing, in which FIG. 1 represents a wiring diagram of an example of the present invention.

First, description will be presented relative to the conventional $n$-selected ordinate method in connection with selected ordinates for X calculation. The range of visible wavelengths $\lambda_v$ to $\lambda_r$ is first divided into $n$ sections by wavelengths $\lambda_i$ which satisfy the following equation:

$$\frac{1}{n} = \int_{\lambda_{-i}}^{\lambda_i} P_\lambda \bar{x}_\lambda d\lambda \Big/ \int_{\lambda_v}^{\lambda_r} P_\lambda \bar{x}_\lambda d\lambda$$

$$i = 1, 2, 3, \ . \ . \ . \ , n$$

$$\lambda_0 = \lambda_v, \ \lambda_{n_1} = \lambda_r \ . \ . \ . \quad (3)$$

and wavelengths $\lambda_i$ which satisfy the formula:

$$\frac{1}{2n} = \int_{\lambda_{-i}}^{\lambda_i'} P_\lambda \bar{x}_\lambda d\lambda \Big/ \int_{\lambda_v}^{\lambda_r} P_\lambda \bar{x}_\lambda d\lambda \ . \ . \ . \quad (3')$$

are selected.

The stimulus value X of a sample having a spectral output $\rho(\lambda)$ is expressed by the following equation:

$$X=\frac{\int_{\lambda_v}^{\lambda_r}P_\lambda\bar{x}_\lambda d\lambda}{n\int_{\lambda_v}^{\lambda_r}P_\lambda\bar{y}_\lambda d\lambda}\sum_{i=1}^{n}\rho(\lambda_i') \quad . \; . \; . \qquad (4)$$

which corresponds to the first of the above equations (2), which includes a coefficient $K_1$ of 1/0.9804n for standard illuminant C. In contrast, the present invention employs a formulae differing from the above Formulae (3) and (3′) to define the new sets of selected wavelengths for all of the tristimulus values X, Y and Z with reference to the Y value for a perfect white body, $\int P_\lambda y_\lambda d\lambda$. By this means, the need of multiplying complicated coefficients is eliminated and the division of the range of visible wavelengths into approximately equal intervals facilitates the calculation while enabling such calculation to be performed with accuracy even where the CIE distribution coefficients are limited.

The calculation formulae of the present invention for the new selected wavelengths are as follows:

$$\left.\begin{aligned} C_i&=\int_{\lambda-i}^{\lambda_i}P_\lambda\bar{x}_\lambda d\lambda\Big/\int_{\lambda_v}^{\lambda_r}P_\lambda\bar{y}_\lambda d\lambda \\ &=\frac{1}{2^m N}\end{aligned}\right\} \; . \; . \; . \qquad (5)$$

where $i=1, 2, 3, \ldots p$, $m=0, 1, 2, 3 \ldots$, $\lambda_0=\lambda_v$, $\lambda_p=\lambda_r$, and $C_i$ designates the coefficients for each of the new selected wavelengths, and N represents such a constant that when it is multiplied by the number of pulses which are generated in a group from the spectrophotometer from the spectrophotometric value of 100%, it produces an integral power of 10. When 500 pulses correspond to the spectrophotometric value of 100%, for example, a solution of N is found to be 20 from the relation of $20\times500=10^4$.

Where the wavelengths $\lambda_i$ are selected so as to satisfy the equation:

$$\frac{C_i}{2}=\int_{\lambda-i}^{\lambda_i'}P_\lambda\bar{x}_\lambda d\lambda\Big/\int_{\lambda_v}^{\lambda_r}P_\lambda\bar{y}_\lambda d\lambda \; . \; . \; . \qquad (5')$$

the tristimulus value X of the sample is expressed as $$X=\sum_{i=1}^{P}Ci\rho(\lambda_i') \qquad (6)$$

The formula is charcterized in that it directly gives the tristimulus values without the need of multiplying the integrated values by some coefficients. The coefficients $C_i$ to multiply $\rho$ for the respective selected wavelengths being a power of ½ divided by the above-mentioned constant N, such calculation may be performed with ease by suitable binary counter circuits. Moreover, the calculation accuracy is comparable to that in the weighted ordinate method since the intervals of the selected wavelengths may be made small enough.

The colorimetric calculation can now be carried out rapidly and with a high accuracy by introducing into an integrating calculator equipped with binary counter circuits pulses representing the values of $f(xi')$ at the wavelengths selected in line with the above conception.

Further, since colorimetric values $x=X/(X+Y+Z)$, $y=Y/(X+Y+Z)$ and $Y$ are generally preferred to X, Y and Z, it is desirable in most cases to indicate X, Y and $S=X+Y+Z$ rather than X, Y and Z. For S, use may be made of the equation $$S=\Sigma Ci\rho(\lambda i')$$

which is similar to the Equation 6 for X.

One specific example of the present invention will now be described which employs a recording spectrophotometer adapted to effect conversion of the 100 percent spectral reflectance to 500 pulses.

TABLE 1.—WAVELENGTHS FOR COLORIMETRIC CALCULATION FOR ILLUMINANT C

| Selected Wavelength, mμ | | Reciprocal of coefficient for X | Reciprocal of coefficient for Y | Reciprocal of coefficient for S |
|---|---|---|---|---|
| Calculated Value | Practical Value | | | |
| 389.49 | (1) | ---------- | ---------- | 1,280 |
| 395.20 | (1) | ---------- | ---------- | 1,280 |
| 397.99 | (1) | 1,280 | ---------- | 1,280 |
| 398.35 | (1) | ---------- | ---------- | 1,280 |
| 400.46 | (1) | ---------- | ---------- | 1,280 |
| 404.01 | (1) | ---------- | ---------- | 320 |
| 405.23 | (1) | 1,280 | ---------- | 1,280 |
| 407.72 | (1) | ---------- | ---------- | 320 |
| 408.94 | (1) | 1,280 | ---------- | 1,280 |
| 411.01 | (1) | ---------- | ---------- | 160 |
| 411.28 | (1) | 1,280 | ---------- | 1,280 |
| 413.80 | (1) | ---------- | ---------- | 160 |
| 415.02 | (1) | 320 | ---------- | 320 |
| 415.38 | (1) | ---------- | ---------- | 320 |
| 417.45 | (1) | ---------- | ---------- | 80 |
| 418.66 | (1) | 320 | ---------- | 320 |
| 419.92 | (1) | ---------- | ---------- | 80 |
| 420.59 | (1) | ---------- | ---------- | 320 |
| 422.61 | (1) | ---------- | ---------- | 40 |
| 422.86 | (1) | ---------- | 1,280 | 1,280 |
| 420.03 | (1) | 160 | ---------- | ---------- |
| 425.30 | (1) | ---------- | ---------- | 40 |
| * | * | * | * | * |
| 547.94 | (1) | ---------- | 80 | 80 |
| 549.16 | 549.11 | ---------- | ---------- | 1,280 |
| 549.22 | (1) | ---------- | 80 | ---------- |
| 549.65 | (1) | 160 | ---------- | 160 |
| 550.38 | (1) | ---------- | ---------- | 80 |
| 550.49 | (1) | ---------- | 80 | 80 |
| 551.76 | (1) | ---------- | 80 | ---------- |
| 553.02 | 553.07 | ---------- | 80 | 40 |
| 553.12 | | 80 | ---------- | |
| * | * | * | * | * |
| 674.02 | (1) | ---------- | ---------- | ---------- |
| 674.89 | (1) | 320 | ---------- | 320 |
| 678.55 | (1) | ---------- | 1,280 | 1,280 |
| 679.23 | (1) | 1,280 | ---------- | 1,280 |
| 681.39 | (1) | 1,280 | ---------- | 1,280 |
| 683.98 | (1) | 1,280 | ---------- | 1,280 |
| 685.20 | (1) | 1,280 | 1,280 | 1,280 |
| 687.19 | (1) | 1,280 | ---------- | 1,280 |
| 691.49 | (1) | 1,280 | ---------- | 1,280 |
| 698.02 | (1) | 1,280 | ---------- | 1,280 |
| 699.53 | (1) | 1,280 | 1,280 | 1,280 |
| 717.48 | (1) | 1,280 | ---------- | 1,280 |

1 Same as calculated value.

The above table includes part of the selected wavelengths $\lambda'_i$ and coefficients $C_i$ for colorimetric calculation for illuminant C as determined by Formulae 5 and 5′ according to the method described above. Indication of the practical values of selected wavelengths in addition to calculated values thereof shows that such shifting of the selected wavelengths does not cause any substantial error in results of calculation and hence is allowable particularly in cases where it is difficult because of apparatus limitations to discriminate differences between selected wavelengths which are smaller than 0.1 mμ.

In FIG. 1, there is shown an example of the electric circuit adapted for colorimetric calculation employing selected wavelengths shown in Table 1, and comprising a recording spectrophotometer 1, a wavelength signal generator 2, a flip-flop circuit 3, a main gate 4, auxiliary gates 5, 6, 7, . . ., 17, binary counter circuits 18, 19, 20, and decimal counter circuits 21, 22, 23.

The recording spectrophotometer 1 is a known apparatus for measuring and recording spectrophotometric values of a specimen throughout the entire wavelengths of the visible range, and comprises means, such as, for example, a digital converter of photometric value disclosed in U.S. Patent No. 3,209,642 to the applicant, for converting a spectrophotometric value to the number of pulses in a pulse group and generating the starting and stopping pulses of each pulse group.

The wavelength signal generator 2 has the same construction as a well-known tape recorder, the tape of the generator interlocking with the wavelength drive of the recording spectrophotometer 1. 14-channel on-off marks are recorded on this tape, and the signals read from the marks are derived from 14 terminals 27–40, respectively.

Each of the binary counter circuits 18, 19 and 20 consists of 6 stages of the binary counting circuit shown, for example, in FIGS. 9–41 of S. Seely, Electronic Engineering, McGraw-Hill Book Co., 1956, page 300, and has 4 or 5 input terminals as shown in FIG. 1.

Each of the decimal counting circuits 21, 22 and 23 consists of 5 stages of the decimal counting circuit shown, for example, in FIGS. 9–46 on page 304 of the above-referenced book.

The flip-flop circuit 3 is a known bistable circuit such as shown, for example, in FIGS. 9–36 on page 298 of the above-referenced book, which delivers an output signal only when it receives the first signal from the terminal 26 of the recording spectrophotometer after it had received a signal from the terminal 27. The gates 4, 5, . . ., 17 are also known, which are shown, for example, in FIGS. 9–16 on page 282 of the above-referenced book. They are in open state to pass pulse signals only during the time intervals beginning from the time when they receive input signals from the left, and ending at the time when they receive input signals from the right in FIG. 1.

Issuing from the terminal 24 of the recording spectrophotometer 1, the value of spectral reflectance $\rho_\lambda$ at any particular wavelength being scanned enters the main gate 4 as a group of pulses of approximately 100 kc. (this and the following numerical values being indicated by example for clarity's sake) and corresponding in number to five times the percent reflectance. The group of pulses are repeatedly generated at a frequency of 150 cycles per second, a starting pulse and a stopping pulse being transmitted from the respective terminals 26 and 25 at the beginning and end of said group of pulses. On the other hand, a pulse signal is generated at the terminal 27 of the wavelength signal generator 2 operatively connected with the wavelength drive of the recording spectrophotometer 1 when the wavelength of the latter is just equal to any of selected wavelengths shown in Table 1 while a category signal is issued from one, two or three of the terminals 28, 29, 30, . . ., 40 to indicate whether the particular wavelength selected is for X, Y or S, and which of 1/40, 1/80, 1/320 and 1/1280 is to be employed as a coefficient for the selected wavelength.

The flip-flop circuit 3 selects only a starting pulse from the terminal 26 immediately after it has received the selected wavelength signal from the terminal 27 and transmits the pulse to the gate 4 to open it. As a result, only a group of pulses issuing from the terminal 24 (the number of such pulses being proportional to the value of $f(\lambda i')$ at the selected wavelength) pass the gate 4, the main gate 4 being immediately reclosed by a stopping pulse from the terminal 25.

Assume that $f(\lambda i')=100\%$ at the first selected wavelength of 389.49 m$\mu$. In this case only 500 pulses are allowed to pass through the main gate 4 as described above. These pulses further pass through the only auxiliary gate 13 opened by a category signal from the terminal 36 to enter the bottom stage of the binary counter circuit 20, and thus pulses of $500/2^6=10{,}000/1280$ are formed through the six stages of the binary counter circuit 20 and added to the decimal counter circuit 23 of five digits to be indicated thereon. A neon tube is also attached to each stage of the binary counter circuit 20 to store fractions of the calculation. A stop pulse is supplied from the terminal 25 to the auxiliary gates 5 to 17 to close the latter each time an addition is completed thereby to preclude any extra addition. In this manner, at the wavelength of 389.49 m$\mu$ indicated in Table 1, the value of reflectance times 1/1280 is registered in the counter circuit for S. For another instance, assume that $f(\lambda i')=100\%$ at the selected wavelength of 553.07 m$\mu$. The 500 pulses passing through the main gate 4 proceed through auxiliary gates 8, 12 and 17 opened by category signals issuing simultaneously from the terminals 31, 35 and 40 to the binary counter circuits 18, 19 and 20 to add $500/2=10{,}000/80$ of pulses to the decimal counter circuits 21 and 22 while adding $500/2=10{,}000/40$ of pulses to the decimal counter circuit 23. On this occasion, the addition is performed including remainders, if any, registered in the binary counter circuits during calculation for the preceding wavelengths. Where the value obtained by such addition has some remainders, they are registered for use in the subsequent calculation. When the integration has been completed up until the final selected wavelength, the tristimulus values X, Y and S are themselves in register in the decimal counter circuits 21, 22 and 23. Also, by reading the indication of the neon tubes remaining in the respective stages of the binary counter circuits 18, 19 and 20, it is possible to know the fractions ½, ¼, ⅛, 1/16, 1/32 and 1/64 of the lowest digit in the decimal counter circuits.

While a particular embodiment has been shown and described, it is apparent that changes and modifications may be made without departing from the invention as defined by the appended claims. Some examples of such modifications follow.

(1) The selected wavelengths for colorimetric calculation for illuminant C shown in Table 1 are an exemplification as determined by Formulae 5 and 5′ and may be varied in different ways. For example, if it is desired to employ more closely spaced wavelengths, coefficients less than 1/1280 may be used. In this case, it is necessary in the circuit shown only to increase the number of stages of the binary counter circuits and that of the auxiliary gates. Also, though Table 1 has been made for cases where the 100% reflectance or transmittance corresponds to 500 pulses and N=20 in Formula 5, similar tables may be prepared as desired for different numbers of pulses.

(2) The selected wavelengths for determining the tristimulus values when CIE standard illuminant A, illuminant B or any other illuminant is employed may be obtained in the same manner as for illuminant C.

(3) In place of the main gate 4 in the circuit shown, an equivalent to the flip-flop circuit 3 may be connected to each of the auxiliary gates with success.

What is claimed is:

1. In an automatic spectrophotometer wherein a spectrophotometric value of a sample for each wavelength is represented by the proportional number of pulses in a pulse group repeatedly generated at a predetermined frequency, means for calculating the tristimulus values of said sample, comprising in combination first means for selecting one of said pulse groups for each of predetermined selected wavelengths, second means connected with said first means for multiplying different kinds of predetermined coefficients proportional to integral powers of ½ to said spectrophotometric values represented by said number of pulses, and third means connected to be supplied from said second means for integrating the output pulses of said second means.

2. Means for calculating the tristimulus values as claimed in claim 1, wherein said first means comprises a wavelength signal generator, a flip-flop circuit and gate circuits, said wavelength signal generator being so constructed as to deliver the signals representing selected wavelengths $\lambda' i$ and coefficients $Ci$ which satisfy the following equations:

$$\frac{Ci}{2}=\int_{\lambda_{i-1}}^{\lambda_i'} P_\lambda \begin{Bmatrix}\bar{x}\\ \bar{y}\\ \bar{z}\end{Bmatrix} d\lambda \Big/ \int_{\lambda_v}^{\lambda_r} P_\lambda \bar{y}_\lambda d\lambda$$

$$Ci=\int_{\lambda_{i-1}}^{\lambda_i} P_\lambda \begin{Bmatrix}\bar{x}\\ \bar{y}\\ \bar{z}\end{Bmatrix} d\lambda \Big/ \int_{\lambda_v}^{\lambda_r} P_\lambda \bar{y}_\lambda d_\lambda=\frac{1}{2^m N}$$

where $i=1, 2, 3, \ldots, P,$
$m=0, 1, 2, 3, \ldots,$
$\lambda_o=\lambda_v, \lambda_p=\lambda_r,$ and $\lambda'_1$ is $i$-th one of said selected wavelength; $Ci$ is said coefficients for said $i$-th selected wavelength; $\lambda r$ and $\lambda v$ are respectively short- and long-end wavelengths of the visible spectrum; $P\lambda$ is spectral distribution of the standard illuminant, $\bar{x}\lambda$, $\bar{y}\lambda$, and $\bar{z}\lambda$ are respective CIE distribution coefficients; $\lambda$ is wavelength; and N is constant selected so that said number of pulses corresponding to 100% output of said spectrophotometer, when multiplied by such constant, produces an integral power of 10.

3. Means for calculating the tristimulus values as claimed in claim 1, wherein said first means consists of a wavelength signal generator operatively connected with the wavelength drive of said spectrophotometer, a flip-flop circuit operating by start and stop pulses from the spectrophotometer, and a main gate circuit operatively connected with said flip-flop circuit to pass through a group of pulse output of the spectrophotometer.

4. Means for calculating the tristimulus values as claimed in claim 1, wherein said second means consists of three binary counting circuits and includes a plurality of auxiliary gate circuits which count the pulse output of the spectrophotometer which are fed a pulse corresponding to the predetermined selective wavelengths from the wavelength signal generator.

5. Means for calculating the tristimulus values as claimed in claim 1, wherein said third means consists of three decimal counting circuits operatively connected with three binary counting circuits respectively.

References Cited by the Examiner

UNITED STATES PATENTS 2,806,205 9/1957 Donath ---------- 235—156 X

OTHER REFERENCES

R. K. Richards, "Arithmetic Operations in Digital Computers," D. Van Nostrand Co., Inc. 1955.

R. P. Burr, et al.: "Simple Color Computer Gives Tristimulus Values," Electronics, October 1955, TK7800, E58 (pp. 166–169).

H. E. Rose, "Electronic Computer for Color Printing," A.I.E.E. Transactions, part I, Communication and Electronics, vol. 74, 1955, TK 1.A6, (pp. 268–272).

MALCOLM A. MORRISON, *Primary Examiner.*

ROBERT C. BAILEY, *Examiner.*

M. J. SPIVAK, E. M. RONEY, *Assistant Examiners.*